(No Model.)
T. M. MOYER.
CHURN.
No. 262,089. Patented Aug. 1, 1882.
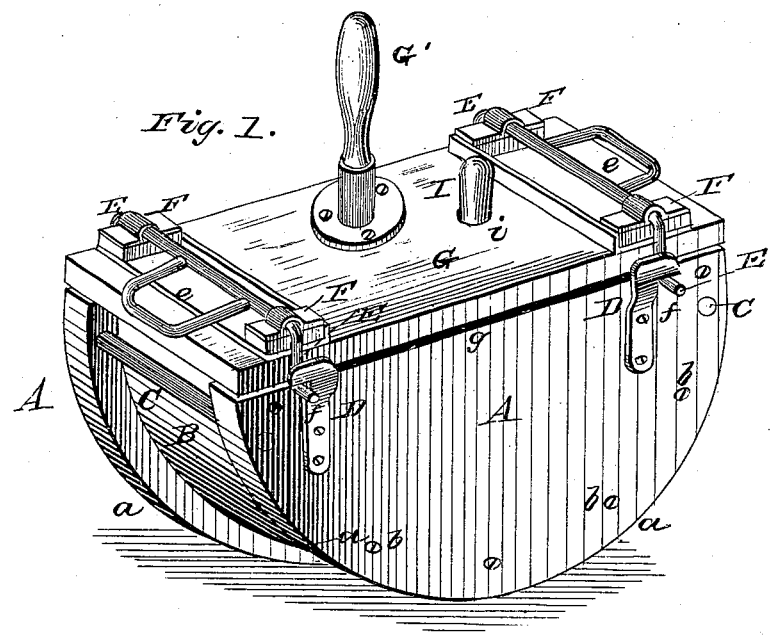
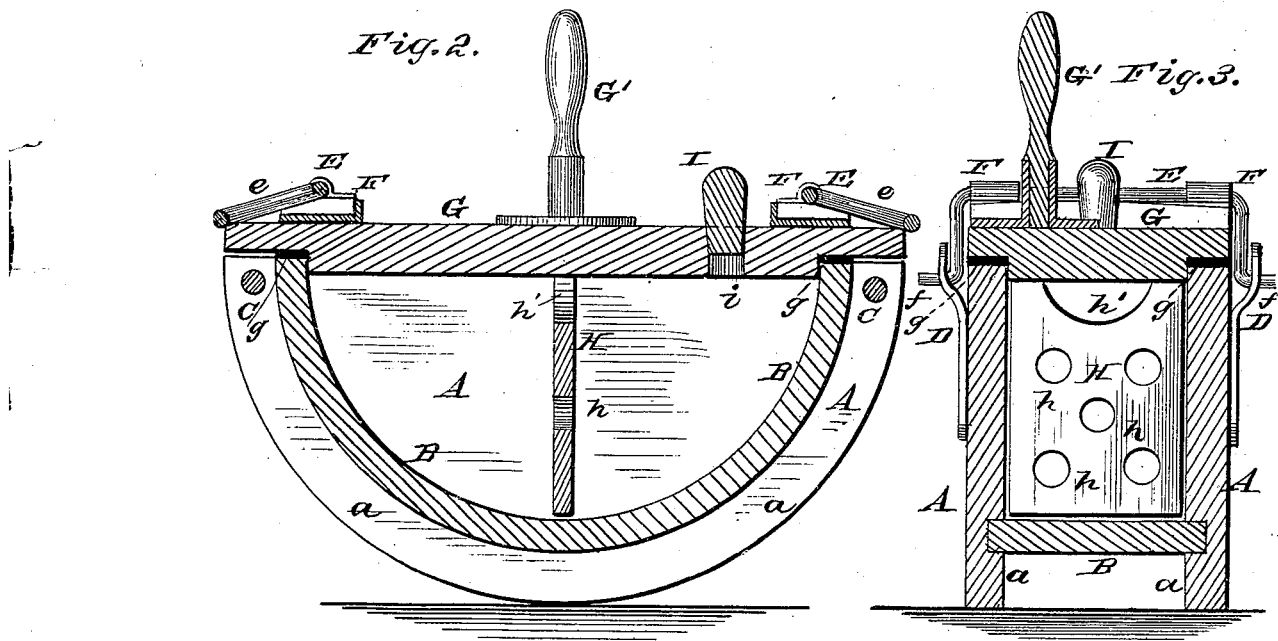
WITNESSES:
Fred. G. Dieterich
P. C. Dieterich
Thomas M. Moyer, INVENTOR,
by Louis Bagger & Co.,
ATTORNEYS.

United States Patent Office.

THOMAS M. MOYER, OF BROOKFIELD, MISSOURI.

CHURN.

SPECIFICATION forming part of Letters Patent No. 262,089, dated August 1, 1882.

Application filed May 29, 1882. (No model.)

*To all whom it may concern:*

Be it known that I, THOMAS M. MOYER, of Brookfield, in the county of Linn and State of Missouri, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn. Fig. 2 is a longitudinal vertical section of the same, and Fig. 3 is a transverse vertical section.

Similar letters of reference indicate corresponding parts in all the figures.

My invention has relation to working-body churns; and it consists in the detailed construction and combination of parts of a churn of that class, as hereinafter more fully described and claimed.

In the accompanying drawings, A represents the segmental side pieces of the churn-body, and B the bottom, which is mortised into the sides so as to leave projecting flanges a, which form the thread or "shoe" of the churn-body, upon which it rests and rocks. The curved bottom is held in place by screws b, inserted through the sides.

C C are wood or iron rods or bolts, which connect the ends of the side pieces outside of the ends of the bottom B, so as to bind the parts firmly together.

To each side of the churn-body are secured hooks D D, two at each end, which engage with catches E E, pivoted in boxes F F upon the top of the cover G. The latter is rabbeted on its under side, and has a packing, g, of rubber, felt, or other suitable material, so as to fit tightly over the churn-body. Cover G has a rigid vertical handle, G', and a fixed dasher, H, arranged centrally and transversely upon its under side, and projecting down (when the cover is in its place) to within a short distance of the bottom of the churn-body, with its sides impinging closely upon the sides of the latter. The dasher H is perforated, as shown at h, and has a larger semicircular opening, h', at top, where it is attached to the cover. i is a vent-hole, which may be closed by a plug, I.

The cream to be churned is placed in the churn-body, after which the cover, with its dasher, is placed in position and locked by turning the bails e of the catches E down from an upright or vertical into a horizontal position, so as to cause their hooked ends f to engage or interlock with the fixed hooks D, as shown in Fig. 1 of the drawings. The churn is then rocked or oscillated by the operator taking hold of the upright or handle G' and moving it forward and back, which throws the body of cream against and through the perforated dash or partition, thus agitating it thoroughly and causing the butter globules to form with great rapidity.

This churn can readily be cleaned after using. There are no nooks or corners where dirt can accumulate out of reach. It is easy to operate, and can be manufactured at a small cost, comparatively.

Having thus described my invention, I claim and desire to secure by Letters Patent of the United States—

In a working-body churn, the combination of churn-body composed of the segmental sides A A, having flanges a a and curved bottom B, and cover G, provided with the fixed transverse dasher H, having apertures h and h', rigid handle G', plugged vent-hole i I, and means for fastening it upon the churn-body, substantially as and for the purpose herein shown and described.

In testimony that I claim the foregoing as my own I have hereunto affixed my signature in presence of two witnesses.

THOMAS MOOR MOYER.

Witnesses:
R. O. STAUBER,
F. G. TORRANCE.